United States Patent Office 2,753,741
Patented July 10, 1956

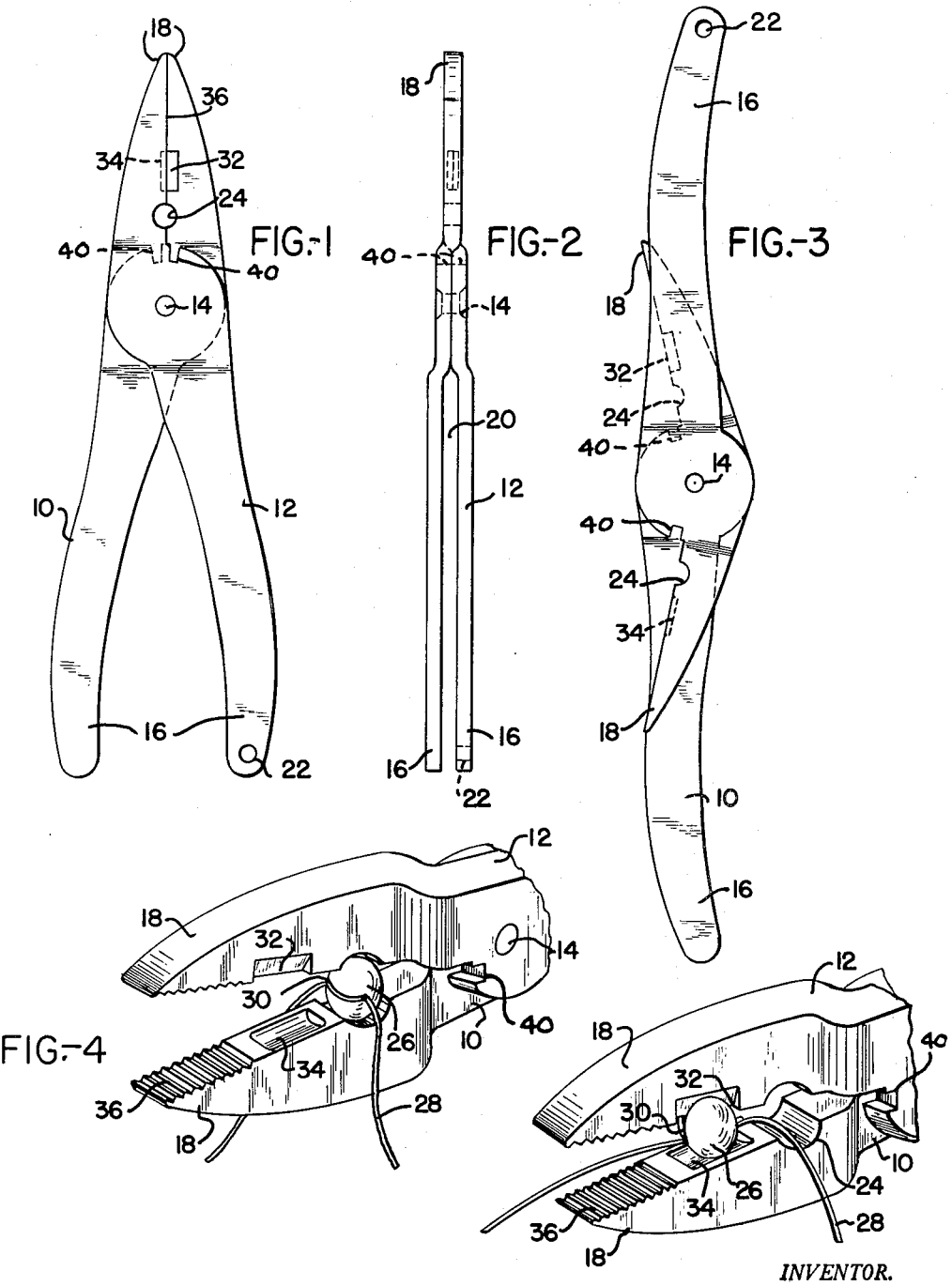

2,753,741

FISHERMAN'S SHOT PLIERS

Wayne L. Riley, Grand Rapids, Mich., assignor to Riley Specialty, Inc., Grand Rapids, Mich., a corporation of Michigan Application April 1, 1954, Serial No. 420,321

3 Claims. (Cl. 81—15)

This invention relates to a fisherman's combination tool, and particularly to a tool especially adapted for attaching and detaching shot to a line.

The attaching of shot to a fishing line, said shot consisting of small pieces of lead, quite often spherical with a slot half-way therethrough, requires the use of a pressure applying tool in order to connect the shot tightly to the line.

While this can be done with substantially any type of plier device, an ordinary plier or pincer will flatten the shot and often damage the line. The removing of the shot from the line is even more difficult to accomplish properly since the shot must be spread or cut in order to release it from the line. It is not particularly safe to employ a knife for this purpose because of the small size of most pieces of shot that are directly attached to a line and the difficulty of holding them properly while exerting pressure at the proper place with a knife edge, with the attendant possibility of cutting the line.

Having the foregoing in mind, it is a particular object of the present invention to provide a tool for attaching shot to a line and for removing shot therefrom which greatly facilitates both of these operations.

A still further object is the provision of a combination tool for both applying shot to a fishing line and for removing the shot therefrom which is easy to operate and is effective and safe to use at all times.

A still further object is the provision of a combination tool of the nature described consisting of a plier-like instrument which can be made from two identical blanks pivoted together between the ends thereof, with the nose parts tapered to serve for removing fish hooks, and having cutting means for wire or leader cutting.

A still further object of this invention is the provision of a plier-like tool for attaching shot to a fishing line and removing it therefrom, particularly constructed so as to permit carrying of the tool suspended from a hook on a belt or the like.

These and other objects and advantages of this invention will become more apparent upon reference to the following description taken in connection with the accompanying drawings, in which:

Figure 1 is a side elevational view of a tool according to this invention;

Figure 2 is a view looking in from the side of Figure 1;

Figure 3 is a view showing how the tool can be opened up to be carried from a hook on the belt;

Figure 4 is a perspective view showing the tool being used for applying shot to a line; and Figure 5 is a perspective view showing the tool being used for removing the shot from a fishing line.

Referring to the drawings somewhat more in detail and in particular to Figures 1 through 3, the tool of the present invention comprises a plier-like device formed by pivotally connecting the two blanks 10 and 12 together intermediate their ends as by the pivot pin 14 which may consist of a screw or advantageously a rivet.

The portions 10 and 12 each consist of a handle end 16 and a nose part 18. The nose parts 18 are offset toward each other by about half the thickness of the stock from which the blanks 10 and 12 are made so that the nose parts line up, as will be seen in Figure 2, while the center portions of the blanks through which the pivot pin 14 passes are in face-to-face engagement. Preferably, the nose parts are specially tapered to be used for removing fish hooks.

According to this invention the handle parts 10 and 12 are offset away from each other to form a space 20 therebetween so that the tool can be opened up flat, as illustrated in Figure 3, so that the hole 22 in blank 12 can be availed of for suspending the tool from a hook on the belt.

The mating faces of the nose parts 18 of the tool are particularly formed to accomplish the task of attaching shot to a fishing line and removing it therefrom by forming in the said nose part the semi-circular notches 24 located fairly close to pivot pin 14. The semi-circular notches 24 can be availed of, as will be seen in Figure 4, for compressing a shot 26 onto a fishing line 28 that has been inserted in the slot 30 of the shot. The location of the semi-circular notches 24 close to pivot pin 14 enable considerable pressure to be developed on the shot, whereby it can be tightly clamped to the fishing line by the exertion of a reasonably small amount of pressure on the handles 16.

Outwardly from the semi-circular notches 24 the one nose part is formed with a wedge-shaped spreading edge 32, and in the other nose part located so as to register with the spreading edge 32 is an elongated concave recess 34 serving as a shot seat. This combination of spreading edge and recess can be employed for quickly removing the shot 26 from the line by placing the shot in the recess with the slot 30 thereof located on top so as to be engageable by edge 32. The exertion of pressure on the handles 16 of the tool will then cause the shot to spread so that it can be detached from the fishing line. It is to be noted that neither the attaching nor detaching operation in any way damages the shot or the line, and because of this the shot can be used many times.

The outer ends of the nose parts of the tool may be left smooth if desired, but also can advantageously have the transverse knurling 36 which enables the tool to be employed for other purposes besides the attaching and detaching of shot and fishing lines.

It will be perceived that the tool, according to the present invention, can be manufactured quite inexpensively inasmuch as the two principal parts thereof can be made from identical blanks, with only minor machine operations being required after the blanks are formed to bring the blanks into the condition in which they are illustrated in the drawings.

The tool is easy and convenient to use, is easy to carry and store, and has long life.

To add to the utility of the tool, the wire cutting notches 40 may be provided in the blanks which operate in a conventional manner for cutting wire, spinner shafts, hooks, leaders, and the like.

The members 10 and 12 are thin enough to permit even a small shot to be handled readily, while the large bearing area of the members about the pivot pin holds the members in true alignment at all times so considerable pressure can be exerted.

It will be understood that this invention is susceptible to modification in order to adapt it to different usages and conditions, and, accordingly, it is desired to comprehend such modifications within this invention as may fall within the scope of the appended claims.

I claim:

1. A plier-like tool for fishermen comprising; two leg parts made of flat stock of uniform thickness pivoted together between their ends to form nose portions at one end and handle portions at the other end, said leg parts having portions between the said nose and handle portions in face-to-face engagement about the said pivotal connection, said nose portions being offset toward each other by about one-half the thickness of the stock so as to be coplanar and said handle portions being offset away from each other by at least one-half the thickness of the stock with the point of pivotal connection of the leg parts as the point of offset of said handle portions, whereby the tool can be opened up flat for storage or carrying, and surfaces formed on the inside of said nose parts for engaging a shot to detach it from a line.

2. A plier-like tool comprising two leg portions pivoted together between their ends, said leg parts having the nose parts offset toward each other so as to be coplanar and having their other ends offset away from each other so as to provide clearance for said nose parts when the tool is open flat, and registering working surfaces formed on the inside of said nose parts.

3. A plier-like tool comprising two leg portions pivoted together between their ends, said leg parts having the nose parts offset towards each other so as to be coplanar and having their other ends offset away from each other so as to provide clearance for said nose parts when the tool is open flat, and notched means in the nose parts adapted for registration to receive a split shot therein for compressing it about a line for operation of the tool.

References Cited in the file of this patent

UNITED STATES PATENTS

| | | |
|---|---|---|
| 838,920 | Varnedoe | Dec. 18, 1906 |
| 942,356 | Shelley | Dec. 7, 1909 |
| 2,548,634 | Stumps | Apr. 10, 1951 |
| 2,571,819 | Boel et al. | Oct. 16, 1951 |
| 2,618,994 | Frazee | Nov. 25, 1952 |
| 2,656,746 | Glass | Oct. 27, 1953 |